(12) United States Patent
Lee

(10) Patent No.: US 11,970,229 B1
(45) Date of Patent: Apr. 30, 2024

(54) VEHICLE CHASSIS

(71) Applicant: Alpha Motor Corporation, Irvine, CA (US)

(72) Inventor: Edward Y Lee, Irvine, CA (US)

( * ) Notice: Subject to any disclaimer, the term of this patent is extended or adjusted under 35 U.S.C. 154(b) by 0 days.

(21) Appl. No.: 18/457,889

(22) Filed: Aug. 29, 2023

Related U.S. Application Data

(63) Continuation of application No. 18/163,004, filed on Feb. 1, 2023, which is a continuation-in-part of application No. 29/838,840, filed on May 16, 2022, and a continuation-in-part of application No. 29/781,864, filed on Apr. 30, 2021.

(51) Int. Cl.
  B62D 63/02 (2006.01)
  B60L 50/50 (2019.01)

(52) U.S. Cl.
  CPC ............ B62D 63/025 (2013.01); B60L 50/50 (2019.02)

(58) Field of Classification Search
  CPC .............................. B62D 63/025; B62D 21/09
  See application file for complete search history.

(56) References Cited

U.S. PATENT DOCUMENTS

| | | | |
|---|---|---|---|
| 4,422,685 A | 12/1983 | Bonfilio et al. | |
| 5,558,369 A * | 9/1996 | Cornea | B62D 21/09 296/29 |
| 6,099,039 A | 8/2000 | Hine | |
| 6,276,477 B1 | 8/2001 | Ida | |
| 7,441,809 B1 | 10/2008 | Coombs et al. | |
| 8,177,277 B2 | 5/2012 | Hedderly | |
| 9,404,717 B2 | 8/2016 | Pfennig et al. | |
| 11,377,089 B1 | 7/2022 | Smith et al. | |
| 11,505,265 B2 | 11/2022 | Lee | |
| 2008/0017426 A1 | 1/2008 | Walters et al. | |
| 2013/0153314 A1 | 6/2013 | Niedzwiecki | |
| 2014/0262583 A1 | 9/2014 | Url | |
| 2016/0046336 A1 | 2/2016 | Norman et al. | |
| 2016/0129958 A1 | 5/2016 | Byrnes et al. | |
| 2017/0001507 A1 | 1/2017 | Ashraf et al. | |

(Continued)

FOREIGN PATENT DOCUMENTS

| | | | | |
|---|---|---|---|---|
| CN | 1162291 A | * | 10/1997 | ........... B21D 11/085 |
| CN | 113071562 A | * | 7/2021 | ............. B60R 19/24 |

(Continued)

*Primary Examiner* — Karen Beck
(74) *Attorney, Agent, or Firm* — Avek IP, LLC

(57) ABSTRACT

An electric vehicle chassis includes a chassis frame having a front portion, a rear portion, and a central portion disposed between the front portion and the rear portion. The chassis includes a front bumper assembly connected to the chassis at the front portion and a left-front and right-front suspension assembly connected to the chassis at the front portion, with each front suspension assembly including upper and lower control arms and a shock absorber. The chassis includes a power supply storage compartment disposed in the central portion, the power supply storage compartment being configured to hold a power supply which is selectively detachable from the chassis frame. The chassis further includes a rear bumper assembly connected to the chassis at the rear portion, as well as a left-rear and right-rear suspension assembly connected to the chassis at the rear portion and the central section.

23 Claims, 19 Drawing Sheets

(56) References Cited

U.S. PATENT DOCUMENTS

| | | |
|---|---|---|
| 2018/0237076 A1 | 8/2018 | Perlo et al. |
| 2018/0345971 A1 | 12/2018 | Birnschein et al. |
| 2019/0210651 A1* | 7/2019 | Svacha ............... B62D 33/077 |
| 2020/0086920 A1* | 3/2020 | Okamoto ............ B62D 25/082 |
| 2020/0139802 A1 | 5/2020 | Nagasaka |
| 2020/0148292 A1 | 5/2020 | Hosbach et al. |
| 2020/0223485 A1 | 7/2020 | Wang |
| 2020/0254900 A1 | 8/2020 | Kumar |
| 2020/0094669 A1 | 10/2020 | Delizo et al. |
| 2020/0406735 A1* | 12/2020 | Nagaya ................ B62D 21/09 |
| 2020/0406975 A1* | 12/2020 | Nagaya .................. B60K 1/00 |
| 2021/0080974 A1 | 3/2021 | Mackin et al. |
| 2021/0094459 A1 | 4/2021 | Caynak |
| 2021/0138887 A1 | 5/2021 | Shih et al. |
| 2021/0206432 A1 | 7/2021 | Willison |
| 2021/0331749 A1 | 10/2021 | Hwang et al. |
| 2022/0017019 A1 | 1/2022 | Subramanian et al. |
| 2022/0041042 A1* | 2/2022 | Drabon .................. B60L 50/60 |
| 2022/0055701 A1 | 2/2022 | Faga et al. |
| 2022/0063424 A1 | 3/2022 | Blankenship |
| 2022/0135133 A1* | 5/2022 | Cai ........................ B62D 21/14 |
| | | 296/26.01 |
| 2022/0135158 A1* | 5/2022 | Lee ......................... B60L 53/80 |
| | | 180/58 |
| 2022/0212736 A1 | 7/2022 | Bollinger et al. |

FOREIGN PATENT DOCUMENTS

| | | | | |
|---|---|---|---|---|
| JP | H08142907 A | * | 6/1996 | |
| JP | 4519195 B1 | * | 8/2010 | ............... B60G 7/02 |
| KR | 20080017426 A | * | 2/2008 | |
| KR | 101244923 B1 | * | 3/2013 | |
| WO | 2007118082 A3 | | 2/2008 | |
| WO | 2009004136 A1 | | 1/2009 | |

* cited by examiner

VEHICLE CHASSIS

RELATED APPLICATIONS

This application is a continuation in part of U.S. application Ser. No. 18/163,004, filed Feb. 1, 2023, which is a continuation in part of U.S. application Ser. No. 29/838,840, filed May 16, 2022, and U.S. application Ser. No. 29/781,864, all of the foregoing incorporated by reference in their entireties herein.

FIELD OF THE INVENTION

The disclosure relates generally to the field of electric vehicles. More specifically, the disclosure relates to a modular electric vehicle chassis.

BACKGROUND OF THE INVENTION

Electric vehicles are generally known in the art, as are vehicles comprised of a power supply, a propulsion system, a chassis or frame, and a body. An example of one such vehicle is disclosed in U.S. Pat. No. 11,505,265 to Lee, the disclosure of which is incorporated herein, in its entirety, by reference. Lee discloses a multipurpose vehicle system having modular components which may be interchanged by a user for a particular application. Typically, electric vehicles use electrical energy as a source of power as an alternative to traditional fossil fuels. The vehicles are propelled by one or more electric motors, which are connected to a power supply such as a rechargeable battery or battery system. These electric vehicles are equipped with high-capacity batteries which enable the vehicles to travel considerable distance between recharging. These batteries, be it during routine maintenance or for a complete replacement, may need to be removed from the vehicle periodically, which may be a tedious and/or difficult task. It is advantageous, therefore, for an electric vehicle, and in particular the vehicle chassis, to facilitate removal and instillation of the rechargeable battery.

In addition to rechargeable batteries, electric vehicles may utilize a hydrogen fuel cell as a power source. However, existing solutions do not allow for simple conversion from one power source type (e.g., a hydrogen fuel cell) to another power source type (e.g., a rechargeable battery system) without extensive modifications to the existing vehicle chassis, which may prove time-consuming and expensive, or without the need for a completely different chassis altogether. It therefore may be desirable for a vehicle chassis to accommodate and facilitate timely component changes, as well as being suitable for a wide variety of power supplies and/or other features.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a vehicle chassis includes a chassis frame having a front portion, a rear portion, and a central portion disposed between the front portion and the rear portion. A front bumper assembly connected to the chassis frame at the front portion, a left-front suspension assembly and a right-front suspension assembly each independently connected to the chassis frame at the front portion, each of the left-front and right-front suspension assemblies including an upper control arm, a lower control arm, and a shock absorber. A power supply storage compartment disposed in the central portion; the power supply storage compartment being configured to hold a power supply. A rear bumper assembly connected to the chassis frame at the rear portion; and a left-rear suspension assembly and a right-rear suspension assembly each independently connected to the chassis frame at the rear portion and the central portion. The central portion of the chassis frame is configured to provide size adjustability of the chassis frame.

According to another embodiment, a vehicle chassis includes a chassis frame having a front portion, a rear portion, a central portion, a first transition section disposed between the front portion and the central portion, and a second transition portion disposed between the central portion and the rear portion. The central portion having a pair of longitudinal supports extending between the first transition section and the second transition section. The front portion having a pair of horizontal supports extending from a front end to the first transition section. The rear portion having a pair of rear longitudinal supports extending from a rear end to the second transition section. A plurality of mating brackets connecting the front portion, the rear portion, the central portion, the first transition section, and the second transition section together to form the chassis frame. Each of the front portion, the rear portion, the central portion, the first transition section, and the second transition section can be independently removed from an associated subset of the plurality of mating brackets.

According to yet another embodiment, a modular chassis for an electric vehicle includes a chassis frame having a front portion, a central section, a rear portion, a first transition portion disposed between the front portion and the central section, and a second transition portion disposed between the central section and the rear portion. The front portion includes a front bumper mounting assembly, a front suspension mounting assembly, and first and second longitudinal parallel supports. Each support is connected to a front bumper mounting member at a first end and connected to a member of the first transition portion at a second end, and the front bumper mounting member is substantially perpendicular to the first and second longitudinal supports. The front portion further includes a front suspension mounting frame connected to the first longitudinal support on a first side and connected to the second longitudinal support on a second side. The central section includes a pair of longitudinal parallel central supports, each central support being coupled to the first transition section at a first and coupled to the second transition portion at a second end. The supports are releasably securable to a vehicle power supply. The rear portion includes a rear bumper mounting assembly, a rear suspension mounting assembly, and third and fourth longitudinal parallel supports. Each support is connected to a rear bumper mounting member at a first end and connected to a member of the second transition portion at a second end, and the rear bumper mounting member is substantially perpendicular to the third and fourth longitudinal supports. The rear portion further includes a first set of rear suspension mounting hardware disposed on the third longitudinal support and a first member of the second transition portion, the rear suspension mounting hardware configured to secure a first rear suspension component therebetween. The rear portion additionally includes a second set of rear suspension mounting hardware disposed on the fourth longitudinal support and a second member of the second transition portion, the rear suspension mounting hardware configured to secure a second rear suspension component therebetween.

BRIEF DESCRIPTION OF THE DRAWINGS

Illustrative embodiments of the present disclosure are described in detail below with reference to the attached drawing figures.

DETAILED DESCRIPTION

The following detailed description intended to be exemplary in nature and is not intended to limit the described embodiments or the application and uses of the described embodiments. As used herein, the words "exemplary" and "illustrative" mean "serving as an example, instance, or illustration." Any embodiment described herein as "exemplary" or "illustrative" is not necessarily to be construed as preferred or advantageous over other embodiments either inherent or expressly described herein. The embodiments described below are exemplary embodiments provided to enable a skilled artisan to make or use the embodiments of the disclosure and are not intended to limit the scope of the disclosure, which is defined by the claims.

Figure 1:
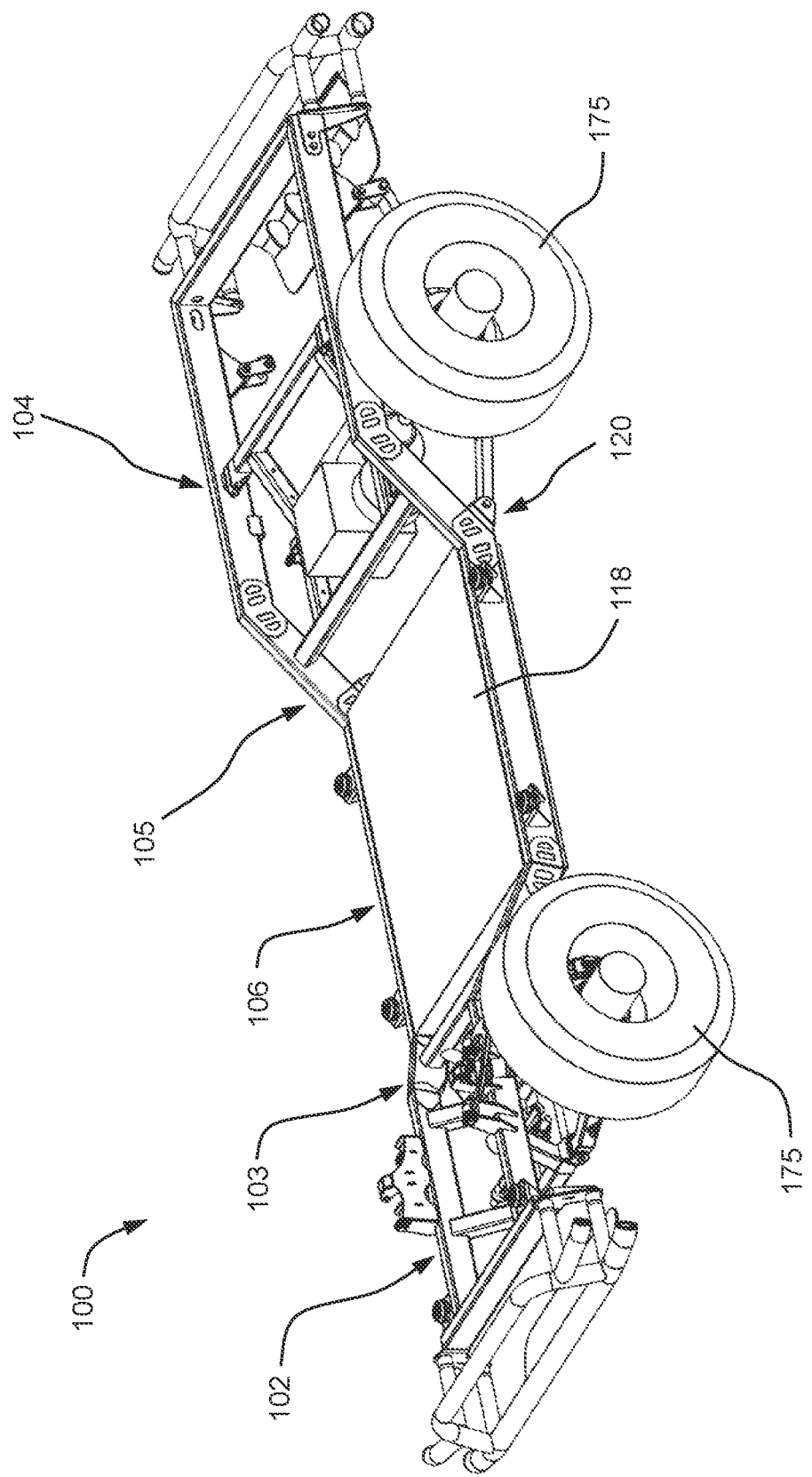
FIG. 1 is a perspective view of a partially assembled vehicle chassis according to an embodiment of the invention.
Figure 2:
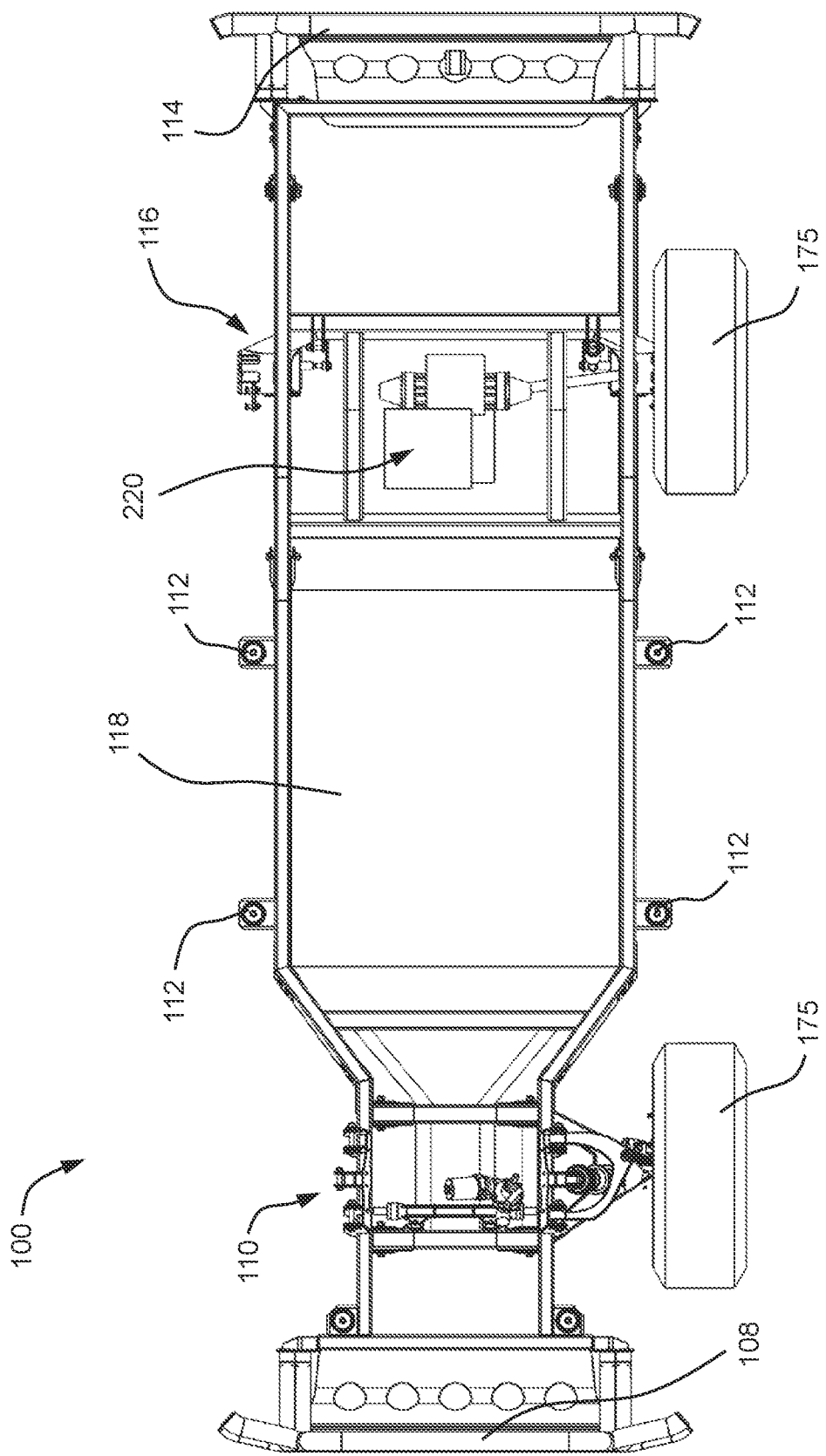
FIG. 2 is a top view of the partially assembled vehicle chassis of FIG. 1.
Figure 3:
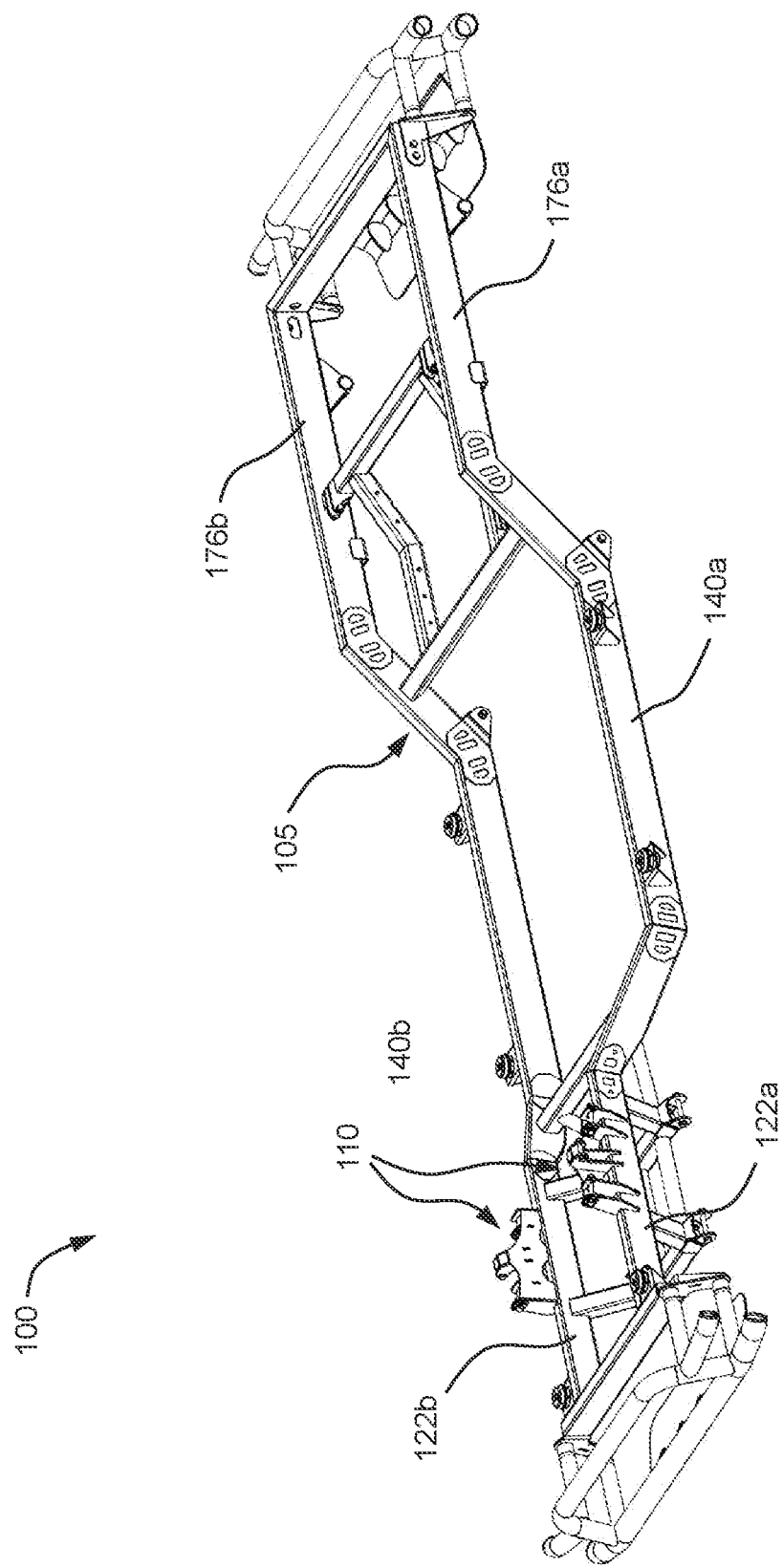
FIG. 3 is another perspective view of a vehicle chassis according to an embodiment of the invention.

For purposes of description herein, the terms "upper," "lower," "left," "rear," "right," "front," "vertical," "horizontal," and derivatives thereof shall relate to the invention as oriented in FIG. 1, unless otherwise stated. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Referring now to FIG. 1, vehicle chassis 100 includes a front portion 102, a rear portion 104, and a central section 106. The front portion 102 is oriented in the direction of travel of the vehicle, and generally includes a front bumper assembly 108, a front suspension mounting assembly 110, and one or more body mounting fixtures 112. The rear portion 104 generally includes a rear bumper assembly 114, a rear suspension mounting assembly 116, and one or more body mounting fixtures 112. The central section 106 generally includes a power supply 118 which is selectively detachable from a main chassis frame 120.

FIGS. 2-5 show the main chassis frame 120 in more detail, including the front bumper assembly 108 and the rear bumper mounting assembly 114. The chassis frame 120, in embodiments, has a generally planform rectangular shape and is formed from a series of interconnected tubes formed from steel or a similar appropriate alloy now known or later developed. In the illustrated embodiment, the front portion 102, the rear portion 104, and the central section 106 are each characterized by their existence on three different horizontal planes. Specifically, in the embodiment shown, the central section 106 consists of the lowest portion of the frame (as clearly shown in FIG. 3), while the front portion 102 is raised relative to the central section 106. Likewise, the rear portion 104 is also raised relative to the central section 106, and in the embodiment shown is raised relative to the front portion 102 as well. The front portion 102 and the central section 106 are connected by a first transition section 103, while the rear portion 104 and the central section 106 are connected by a second transition portion 105. A skilled artisan will appreciate that the exact geometric relation and relative height of the front portion 102, rear portion 104, and central section 106 may vary in other embodiments not shown without departing from the scope of the invention. The chassis frame may have a constant width along its length, or as shown in the illustrated embodiment, the chassis frame may include a portion of reduced width, such as the front portion 102.

Figure 4:
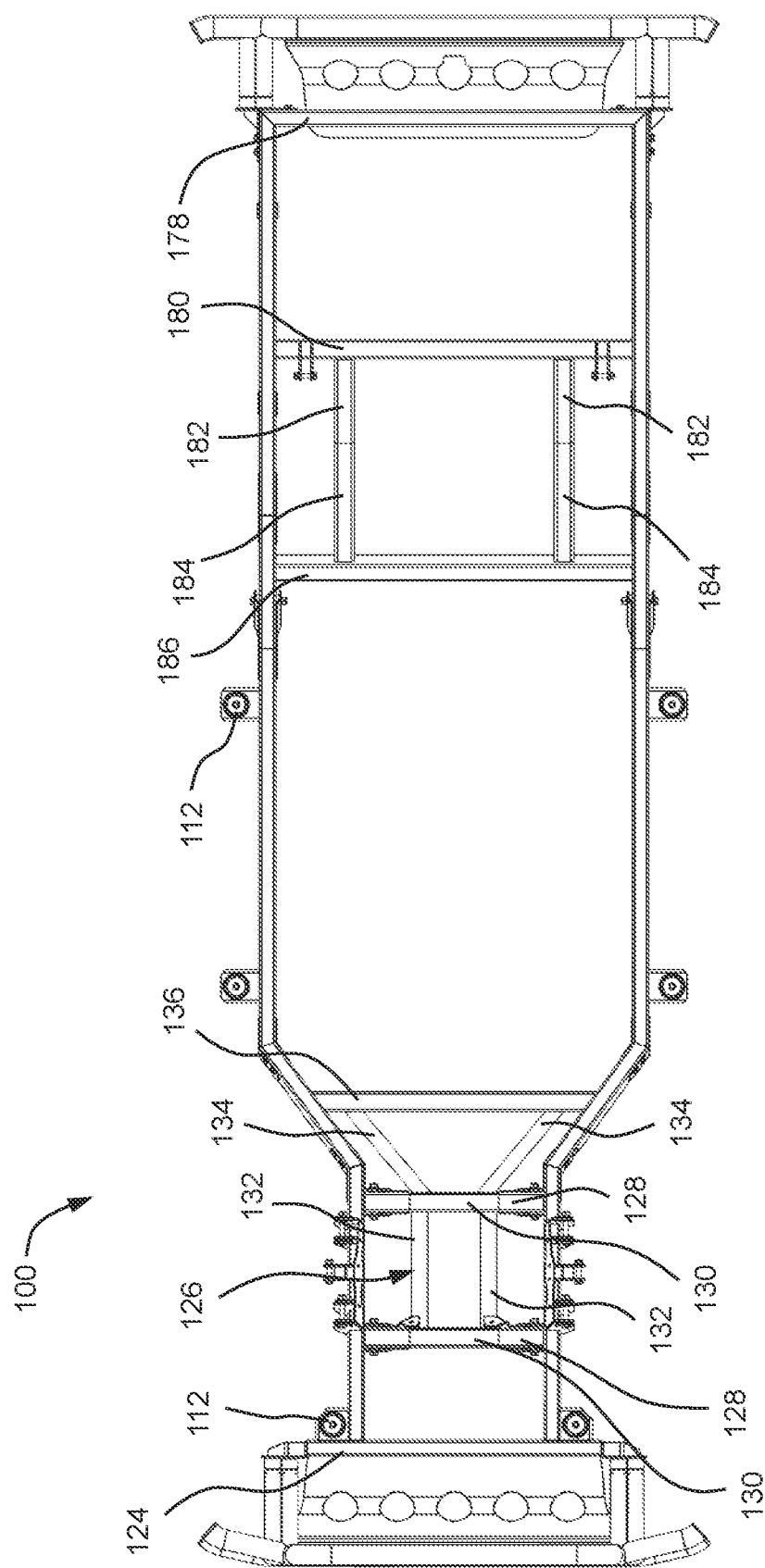
FIG. 4 is a top view of the vehicle chassis shown in FIG. 3.
Figure 5:
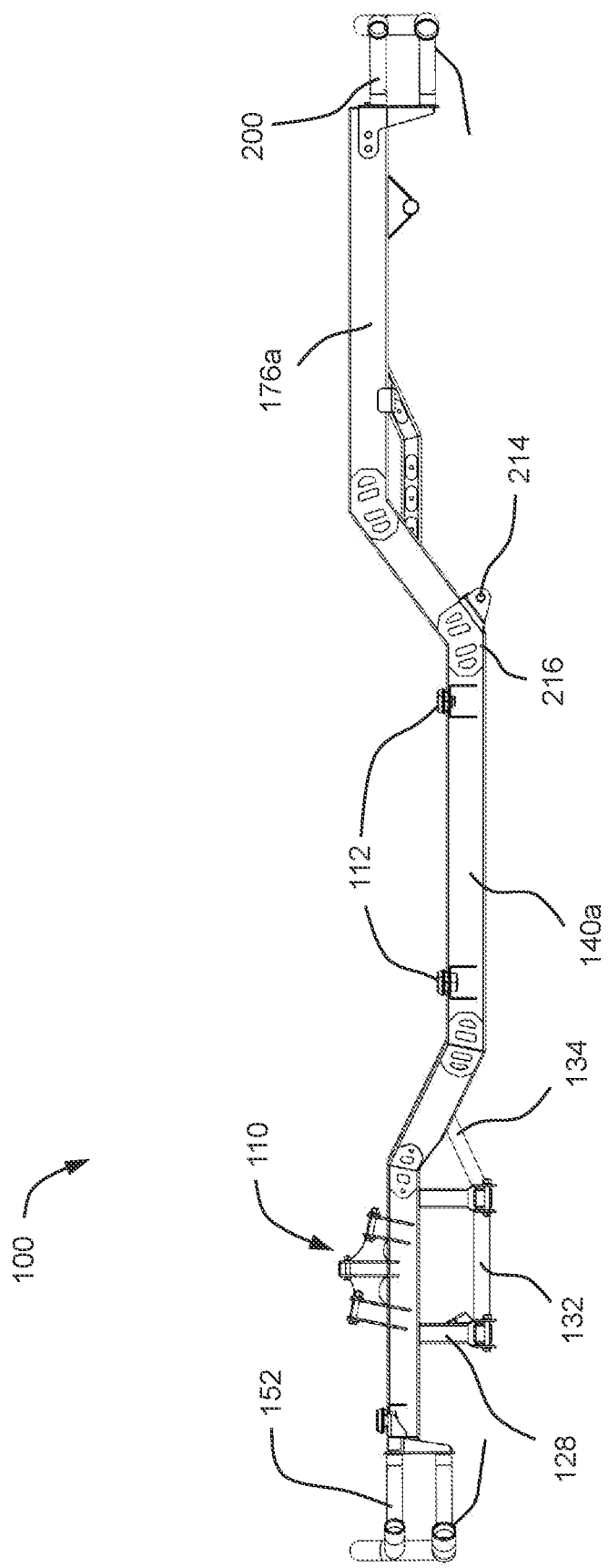
FIG. 5 is a side view of the vehicle chassis shown in FIG. 3.

As best shown in FIG. 4, the front portion 102 generally includes a pair of parallel, longitudinally-oriented, substantially horizontal supports 122a and 122b, which are connected to a front bumper mounting member 124 at a first end. The front bumper mounting member 124 may be substantially perpendicular to the longitudinal supports 122a and 122b, and may be affixed to said supports via welding, mechanical fasteners, or other methods of rigid attachment now known or later developed. In some embodiments, the front bumper mounting member 124 may be selectively detachable from the longitudinal supports 122a and 122b, so as to allow for modification of the chassis frame 120. There may be one or more body mounting fixtures 112 (shown in detail in FIG. 19) attached to the longitudinal supports 122a and 122b, and/or to the front bumper mounting member 124. In the illustrated embodiment, the body mounting fixtures 112 are attached on an outward face of the longitudinal supports 122 proximate the junction between each support 122a, 122b and the front bumper mounting member 124.

Figure 9:
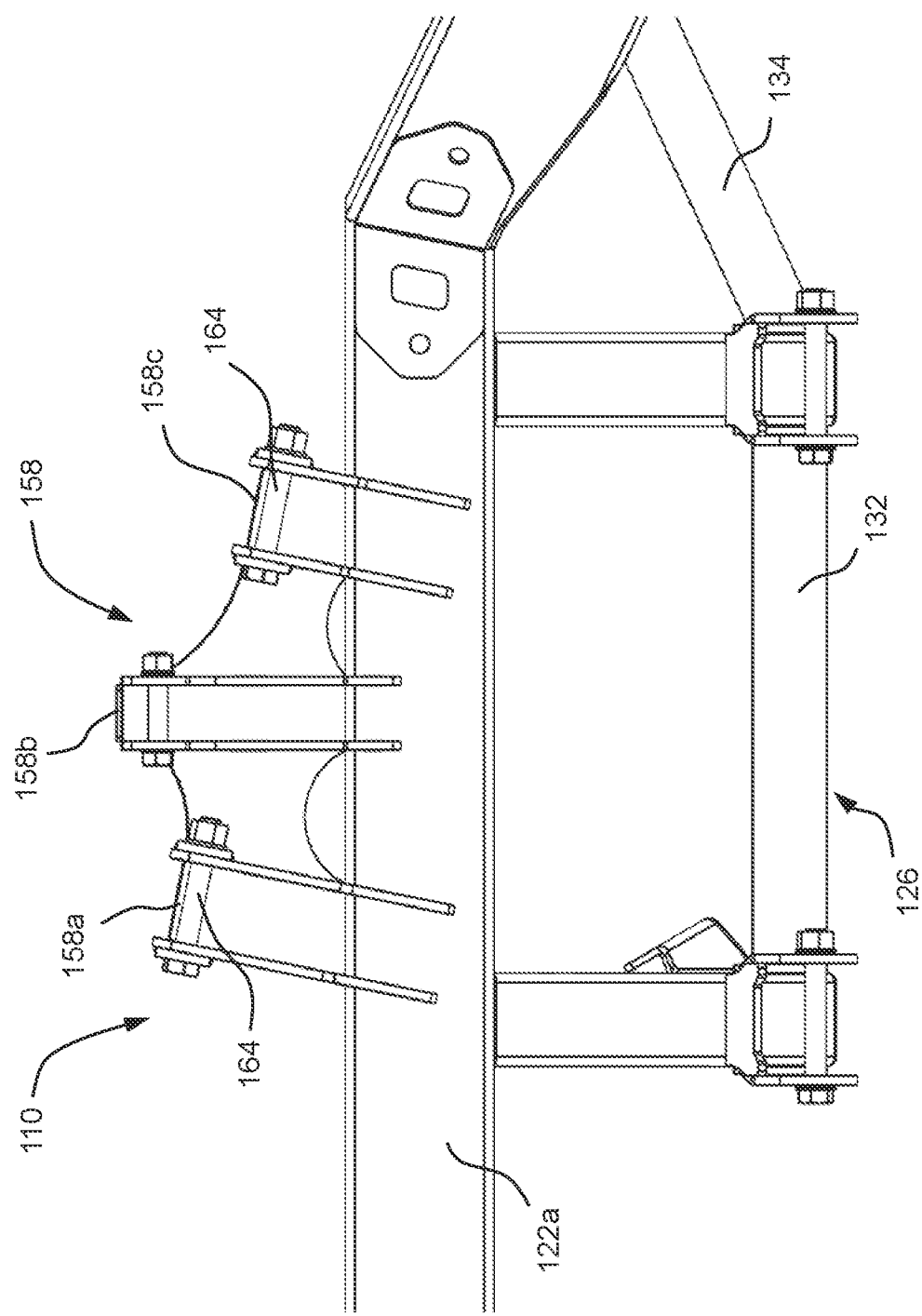
FIG. 9 is a side view of a front suspension mounting assembly according to an embodiment of the invention.
Figure 10:
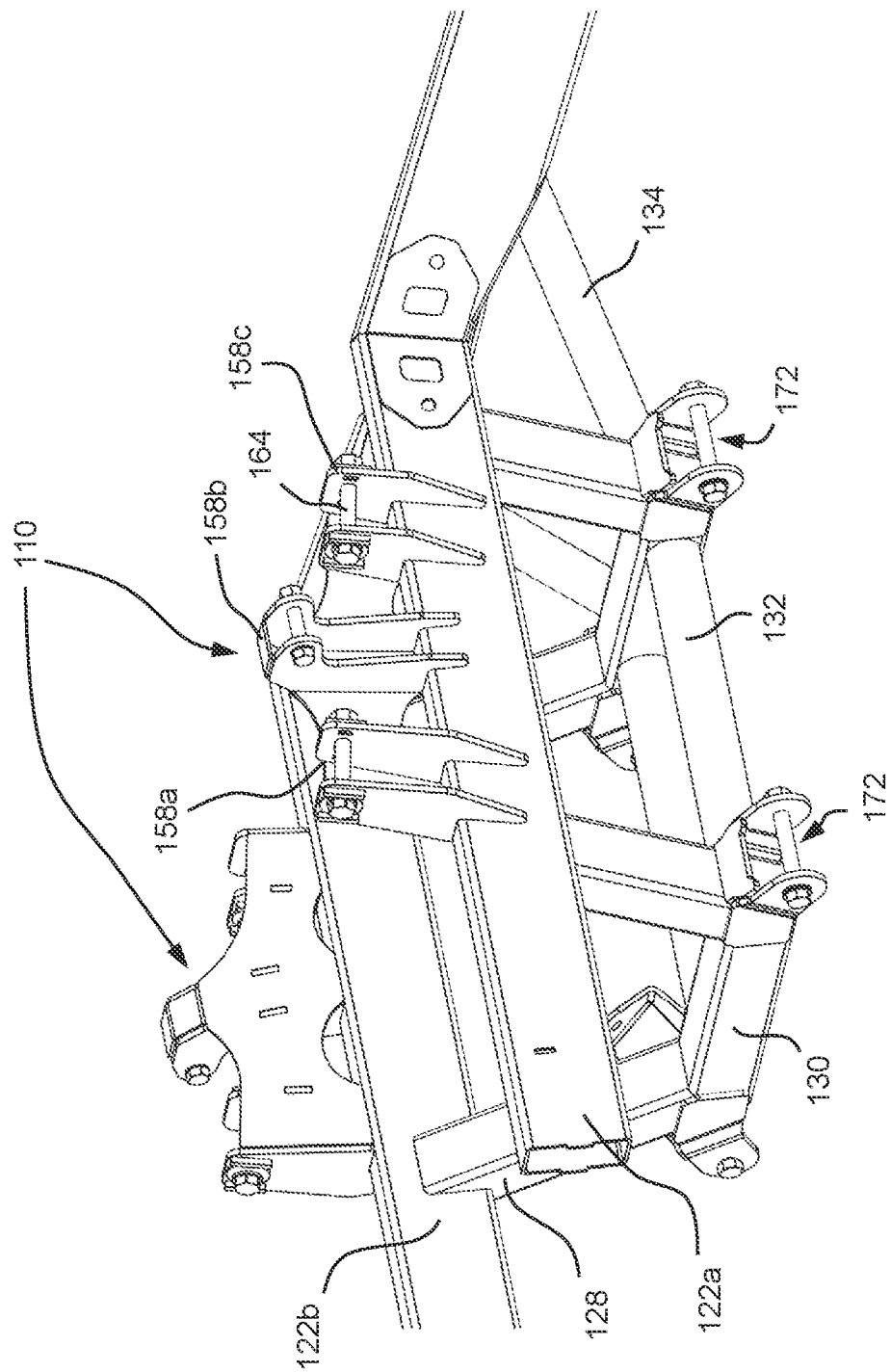
FIG. 10 is a perspective view of the front suspension mounting assembly of FIG. 9.

The longitudinal supports 122a and 122b are further connected by the front suspension mounting assembly 110 (also shown in FIGS. 9-11), which includes a suspension mounting frame 126. The suspension mounting frame 126 is connected to the first longitudinal support 122a on a first side, and is connected to the second longitudinal support 122b on a second side. The suspension mounting frame 126 is generally symmetrical about a longitudinal centerline of the chassis frame 120, and includes angular supports 128 extending downward and inward from the longitudinal supports 122a and 122b, lower parallel lateral supports 130, and lower parallel longitudinal supports 132. In the embodiment shown, the angular supports 128 and lateral supports 130 have a generally rectangular cross section, while the lower longitudinal supports 132 have a generally circular cross-section. One of skill in the art will appreciate that the supports 128, 130, and 132 may be formed from tubes having a variety of cross-section shapes without departing from the scope of the invention. The suspension mounting frame 126 may be further connect the front transition portion 103 by a pair of angularly offset supports 134 which each attach to the suspension mounting frame 126 at a first end and to a lateral support member 136 at a second end.

The central section 106 is sized to and configured to hold a power supply 138, such as an electric vehicle battery or a hydrogen fuel cell. The central section 106 is formed primarily by two central, parallel, longitudinal supports 140a and 140b, each support being connected to the first or front transition section 103 at a first end and being connected to the second or rear transition section 105 at a second end. In embodiments wherein the power supply 138 is a battery for an electric motor, the battery may be of any type now known or later developed, such as lithium-ion, nickel-cadmium, etc. without departing from the scope of the invention. The power supply 138 is selectively detachable from the chassis frame 120 and the central supports 140a-b, so as to allow for either routing maintenance or a replacement power supply to be installed. Preferably, the chassis frame 120 and the central supports 140a-b are configured to releasably engage with a plurality of power supplies 138, such that one type of power supply 138 (e.g., a battery) may be removed from the chassis frame 120 and replaced with another type of power supply 138 (e.g., a hydrogen fuel cell) at a user's discretion. This modularity allows the chassis 100 to be compatible with a wide variety of power supplies 138 either now known or later developed as battery technology continues to evolve and hydrogen fuel cells become more commercially viable and widely available for public use. In addition, the modularity allows for the chassis 100 to support a variety of vehicle styles and bodies, thereby reducing the cost of vehicle production by a manufacturer of multiple vehicle styles.

The chassis 100, and specifically the chassis frame 120, is preferably formed such that various components ma be altered or replaced to allow for different sizes (e.g., different widths and/or lengths) of vehicle configurations to use the same base chassis. To facilitate this, for example, the central supports 140a-b may be releasably decoupled from the transition sections 103 and 105 and may be replaced with similar supports of a different length which perform substantially the same function. Alternatively, the supports 140a-b may be telescoping, allowing for the length of the supports 140a-b and the chassis 100 as a whole to be altered without any disassembly.

The central section 106 further includes one or more body mounting fixtures 112 disposed along an exterior perimeter of the chassis frame 120. In the illustrated embodiment, the central supports 140a-b include four body mounting fixtures 112, located proximate a front portion and a rear portion of each support 140a-b, although in other embodiments not shown the relative placement and/or number of body mounting fixtures may differ without departing from the scope of the invention.

Figure 6:
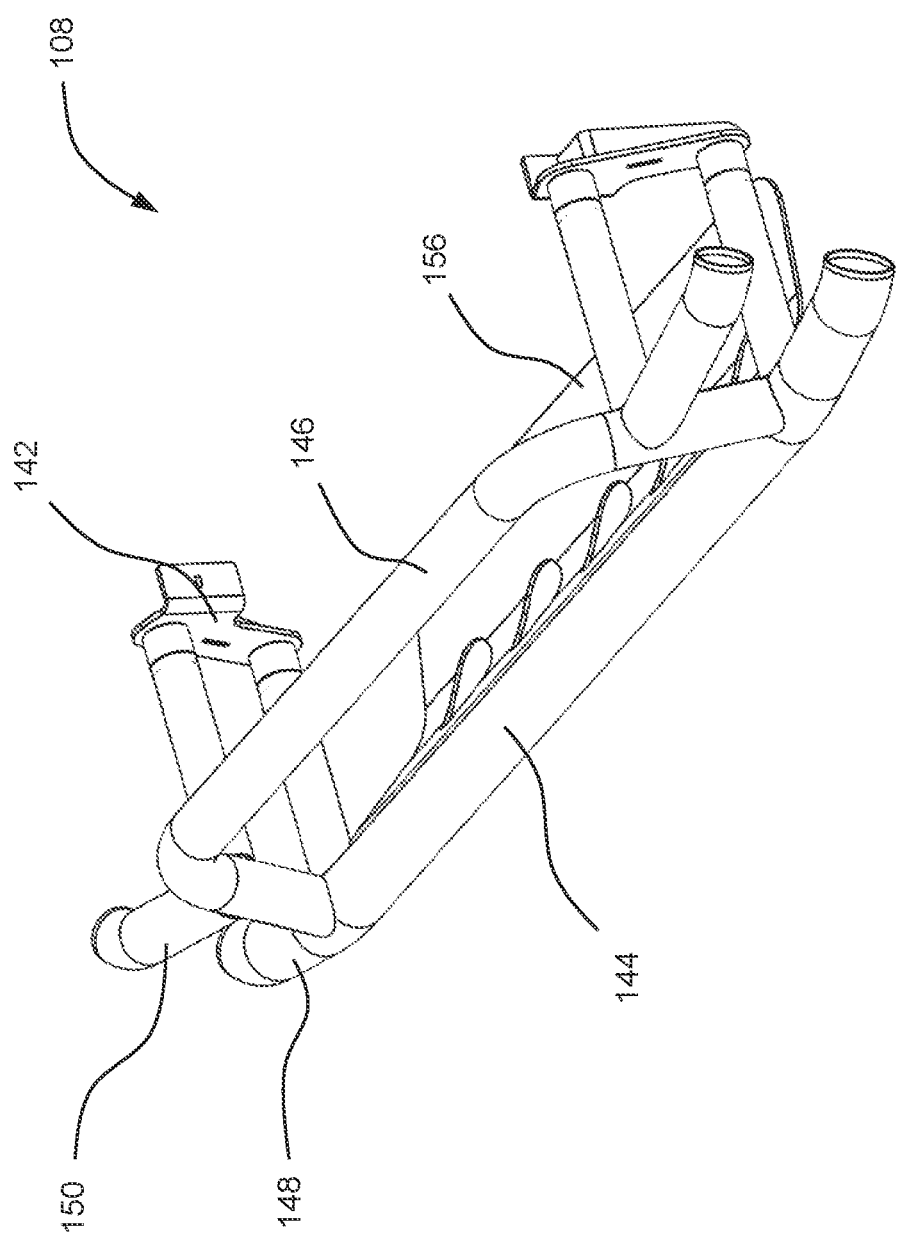
FIG. 6 is a front perspective view of a front bumper mounting assembly according to an embodiment of the invention.
Figure 7:
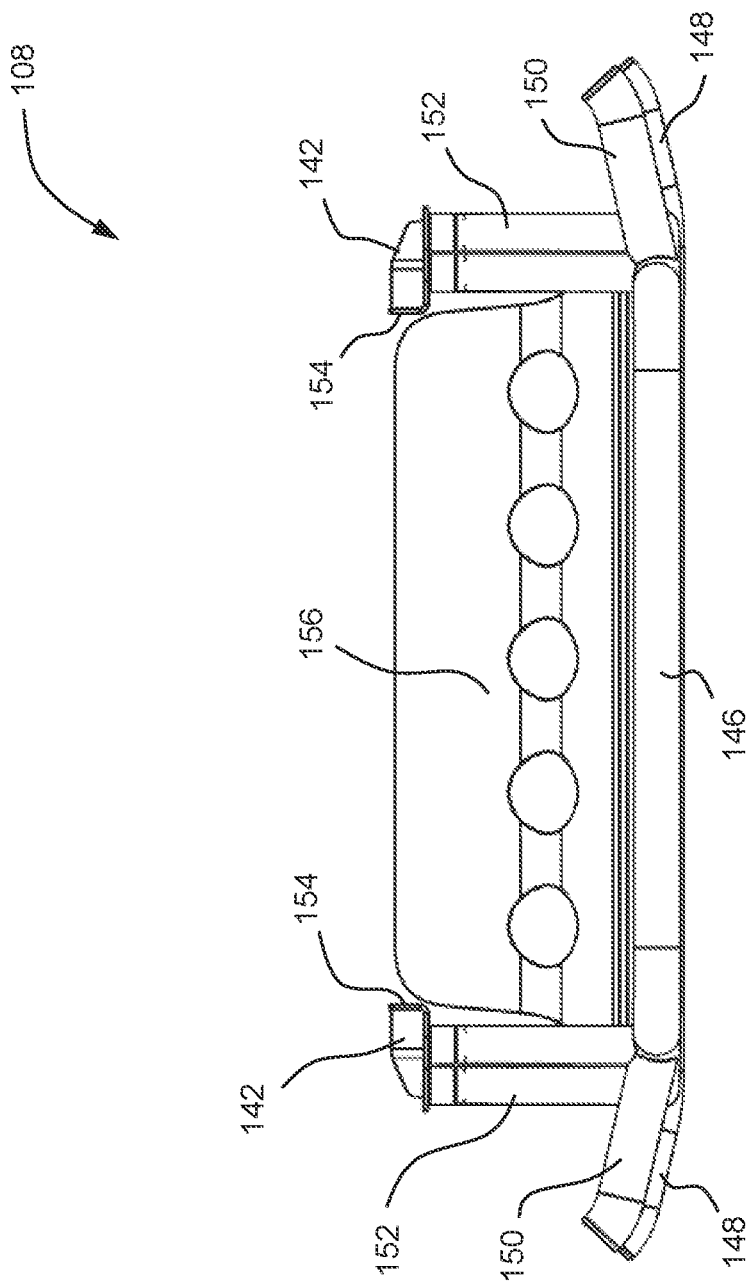
FIG. 7 is a top view of the front bumper mounting assembly of FIG. 6.
Figure 8:
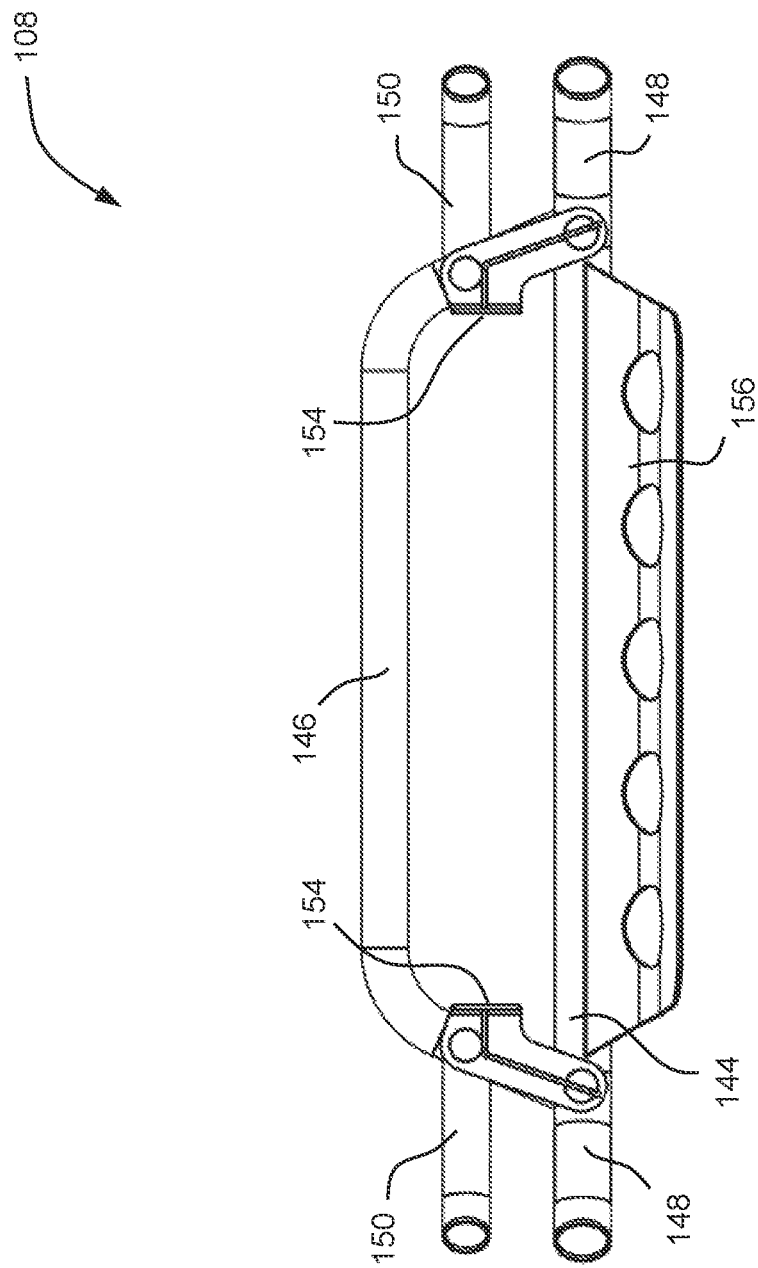
FIG. 8 is a rear view of the front bumper mounting assembly of FIG. 6.

Referring now to FIGS. 6-8, the chassis 100 includes a front bumper assembly 108 which provides additional strength to the front portion 102 of the chassis in the event of a front-end collision. The front bumper mounting assembly is sized to support and/or connect to one or more front bumper body panels on the vehicle. In some embodiments, the front bumper assembly 108 may include one or more body mounting fixtures 112. The front bumper assembly 108 is coupled to the chassis frame 120 via a pair of front bumper mounting brackets 142. In some embodiments, the front bumper mounting brackets 142 may be rigidly coupled to the front bumper mounting member 124, while in other embodiments the front bumper assembly 108 may be selectively detachable from the front bumper mounting member 124. Preferably, the front bumper mounting member 124 is configured such that a variety of different front bumper geometries may be used with a common chassis frame 120, increasing the modularity of the chassis 100.

The front bumper assembly 108 is generally formed from a tubular steel (or similarly appropriate metal alloy now known or later developed) structure consisting of a lower bar 144 and an upper bar 146. The lower bar 144 is generally linear and horizontal, although the end portions 148 may be slightly curved in order to accommodate a wide variety of body panel geometries. The upper bar 146 may be generally referred to as being U-shaped, and may additionally include extensions 150 which are substantially similar in shape to the end portions 148 of the lower bar 144.

The upper and lower bars are connected to the pair of front bumper mounting brackets 142 by one or more longitudinal connecting members 152. Each of the front bumper mounting brackets 142 includes a substantially vertical inward face 154, at which the front bumper mounting member 124 on the chassis frame 120 may be affixed to the front bumper assembly 108. The front bumper assembly 108 may additionally include a skid plate 156 affixed to the lower bar 144 and extending downwardly therefrom.

Figure 11:
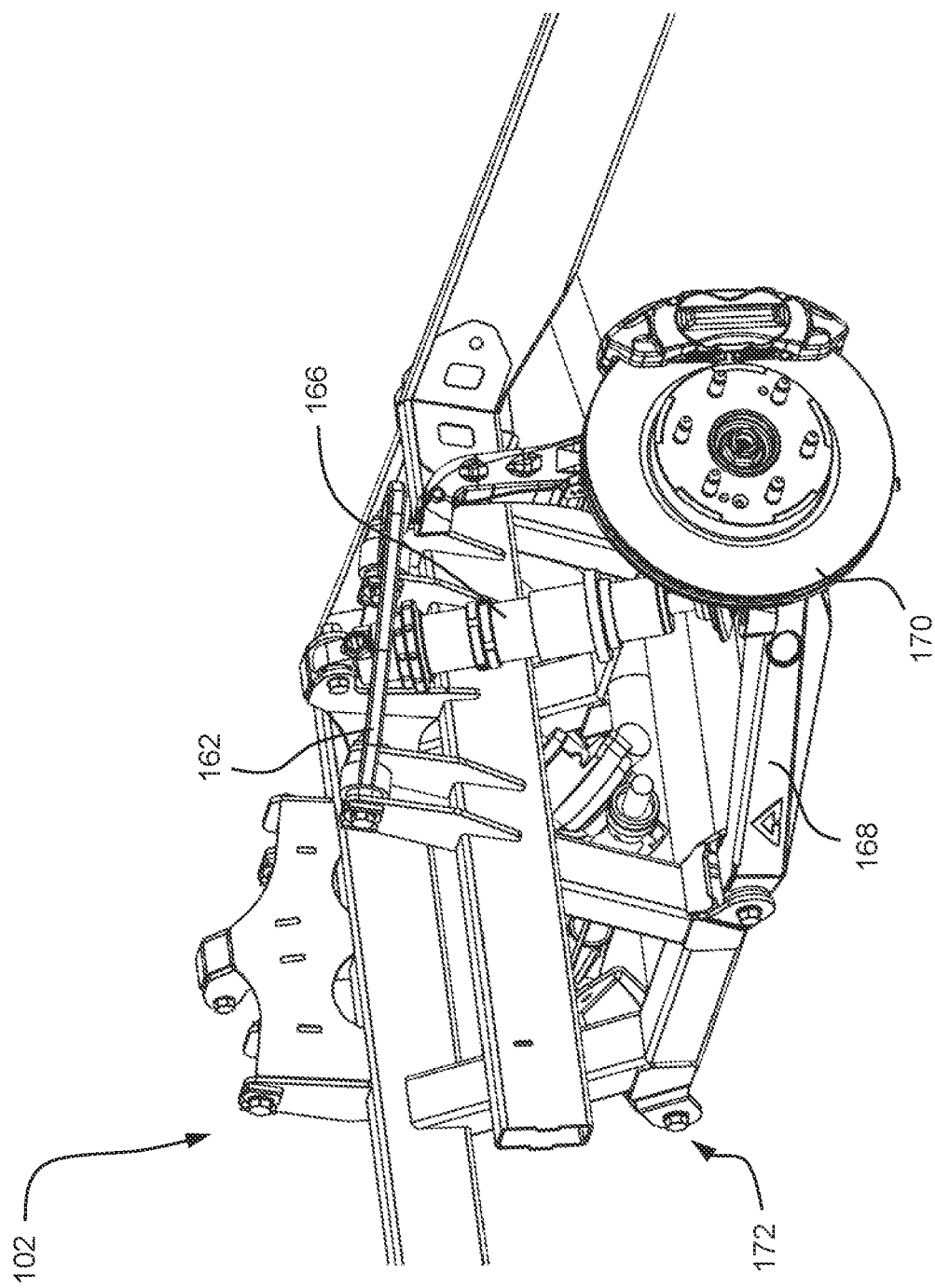
FIG. 11 is a perspective view of the front suspension mounting assembly of FIG. 9 with a front suspension assembly.
Figure 12:
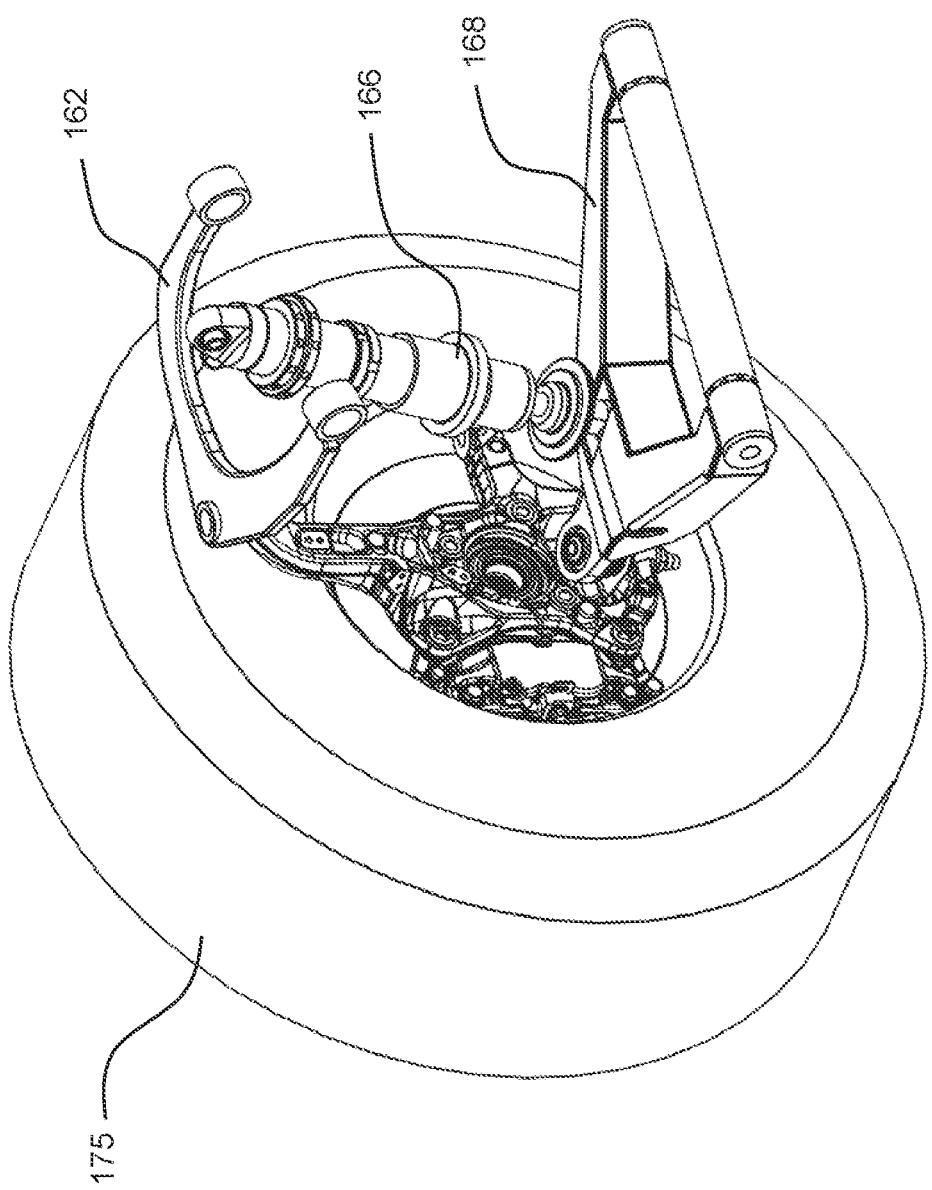
FIG. 12 is a perspective view of a front suspension assembly according to an embodiment of the invention.
Figure 13:
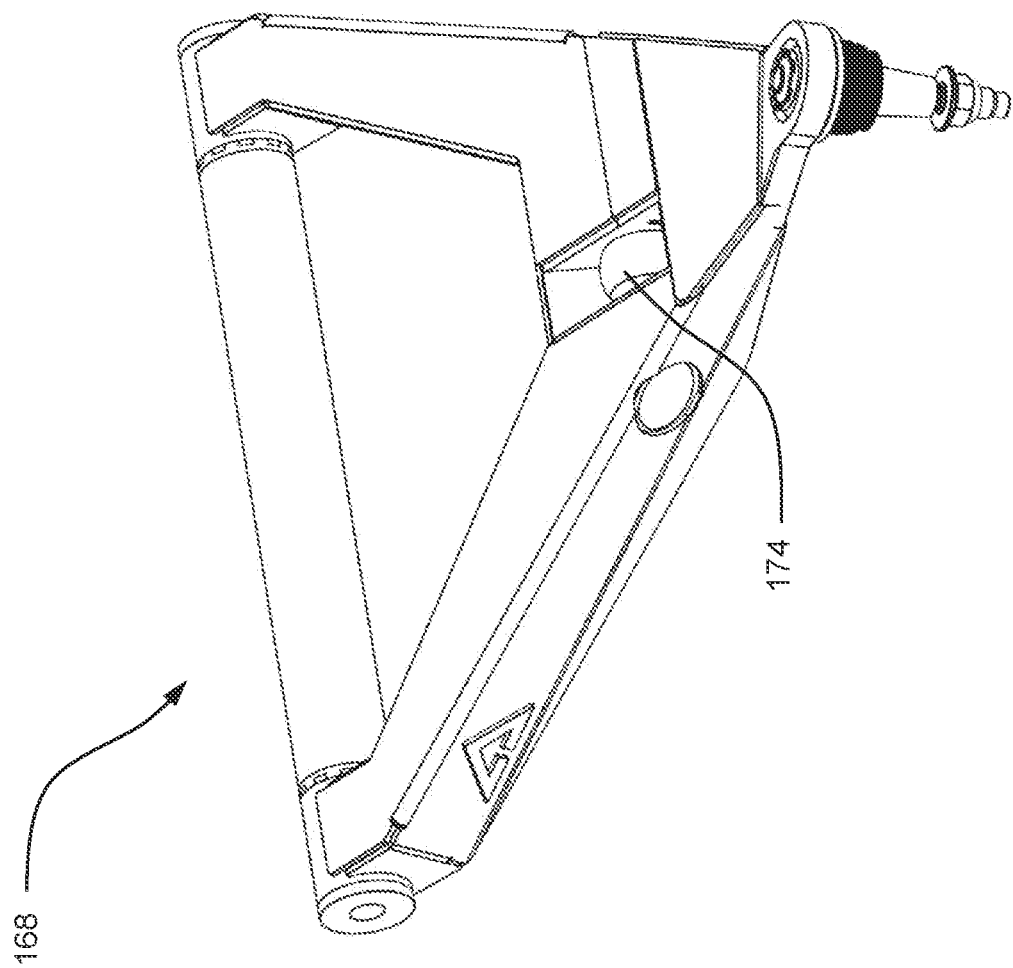
FIG. 13 is a perspective view of a lower control arm forming part of the suspension assembly of FIG. 12.

FIGS. 9-13 illustrate various aspects of the chassis 100 relating to the front suspension and brakes. Specifically with reference to FIGS. 9 and 10, the front suspension mounting assembly 110 includes a plurality of front suspension mounting brackets or devises 158a, 158b, and 158c which are configured to hold various elements to the front suspension assembly 160. The front suspension mounting brackets 158 are generally affixed to and project upward from a front portion longitudinal support 122a or 122b (122a for driver's side, 122b for the passenger's side in the illustrated embodiment). The front suspension brackets 158 may be substantially vertical, or may be angularly offset from the vertical as shown in the illustrated embodiment. Front suspension brackets 158a and 158c are generally configured to secure an upper control arm 162 of the front suspension (as shown in FIG. 11), and as such the upper control arm mounting pins (which may be in the form of bolts or similar mechanical fasteners as illustrated) 164 are preferably substantially coaxial. The central bracket or clevis 158*b* is configured to secure an end of a shock absorber 166. The central bracket or clevis 158*b* may be substantially parallel to the upper control arm mounting brackets 158*a* and 158*c*, or may be offset as shown in the illustrated embodiment.

In addition to the upper control arm 162 and shock absorber 166, the front suspension assembly 160 further includes a lower control arm 168 and a front disc brake assembly 170. The lower control arm 168, best shown in FIG. 13, may be generally describes as being wishbone- or delta-shaped in nature. The lower control arm 168 is securable to the chassis 100 by a pair of lower control arm mounts 172 disposed on the front suspension mounting frame 126 which slidingly engage with a proximal end of the lower control arm 168, and the lower control arm 168 is attachable to the brake assembly 170 at a distal end. The lower control arm 168 also includes a mount 174 for a second end of the shock absorber 166, which may be in the form of a spherical rod end bearing or similar pivotable mount. The front suspension and brake assemblies 160 and 170 allow for selective attachment of a suitable wheel 175 to allow the vehicle to move as desired by the user.

Turning now to the rear portion 104 of the chassis 100, the rear portion 104 is structurally similar to the front portion 102 with some differences. The rear portion generally includes two longitudinal parallel rear supports 176*a* and 176*b*, each connected to the second transition section 105 at a first end and connected to a rear bumper mounting member 178 at a second end. The rear bumper mounting member 178 performs substantially the same function as the front bumper mounting member 124, and is preferably perpendicular to the longitudinal supports 176*a-b* and is affixed to the supports 176*a-b* at each end. The rear portion 104 of the chassis frame 120 further includes a lateral cross brace 180 which extends between the two parallel supports 176*a-b* approximately halfway between the second transition section 105 and the rear bumper mounting member 178. The cross brace 180 may itself be connected to the second transition section 105 by a pair of downwardly-angled supports 182 and a pair of longitudinal supplementary supports 184, which connect to a cross brace 186 of the second transition section 105.

Figure 14:
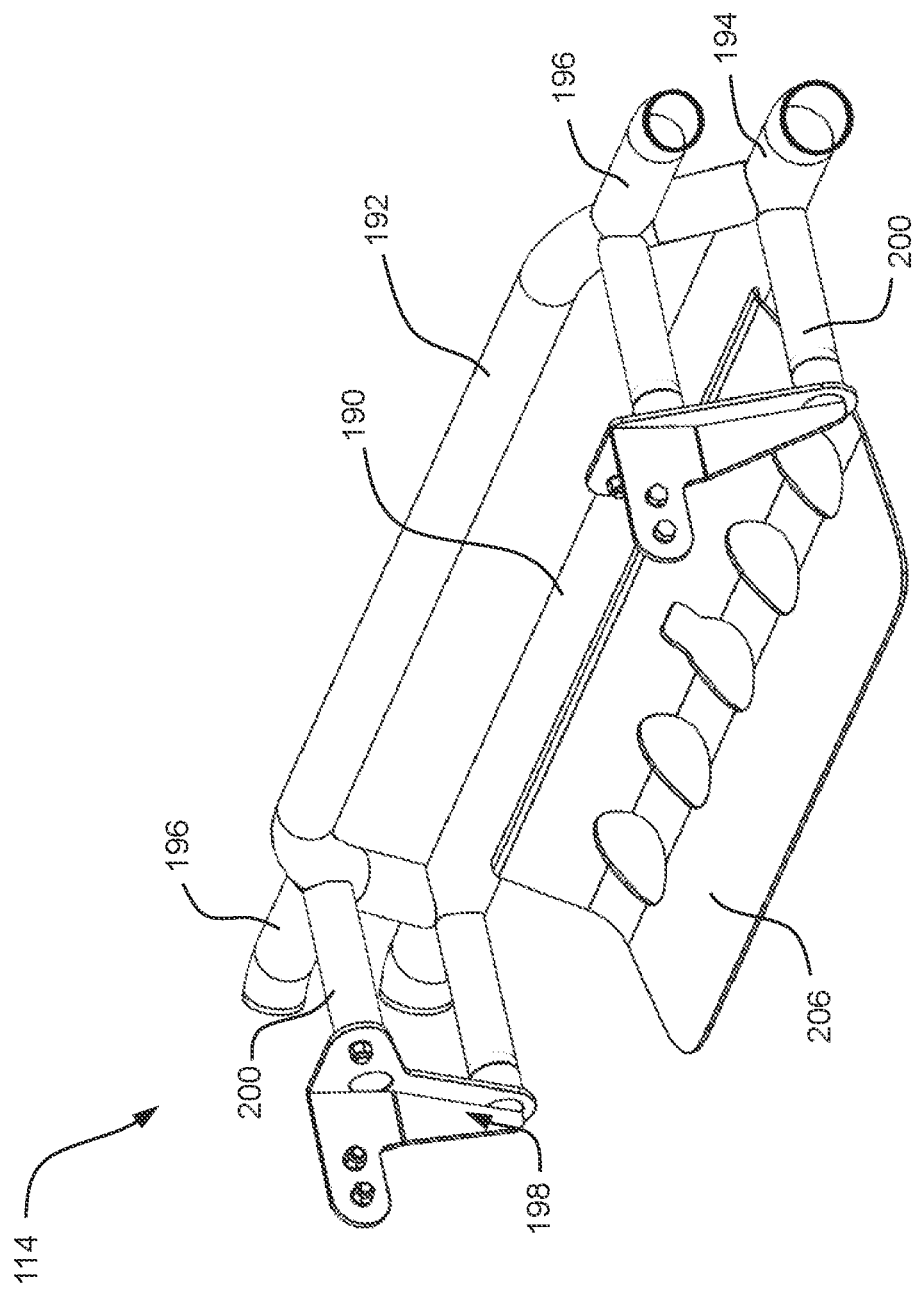
FIG. 14 is a perspective view of a rear bumper mounting assembly according to an embodiment of the invention.
Figure 15:
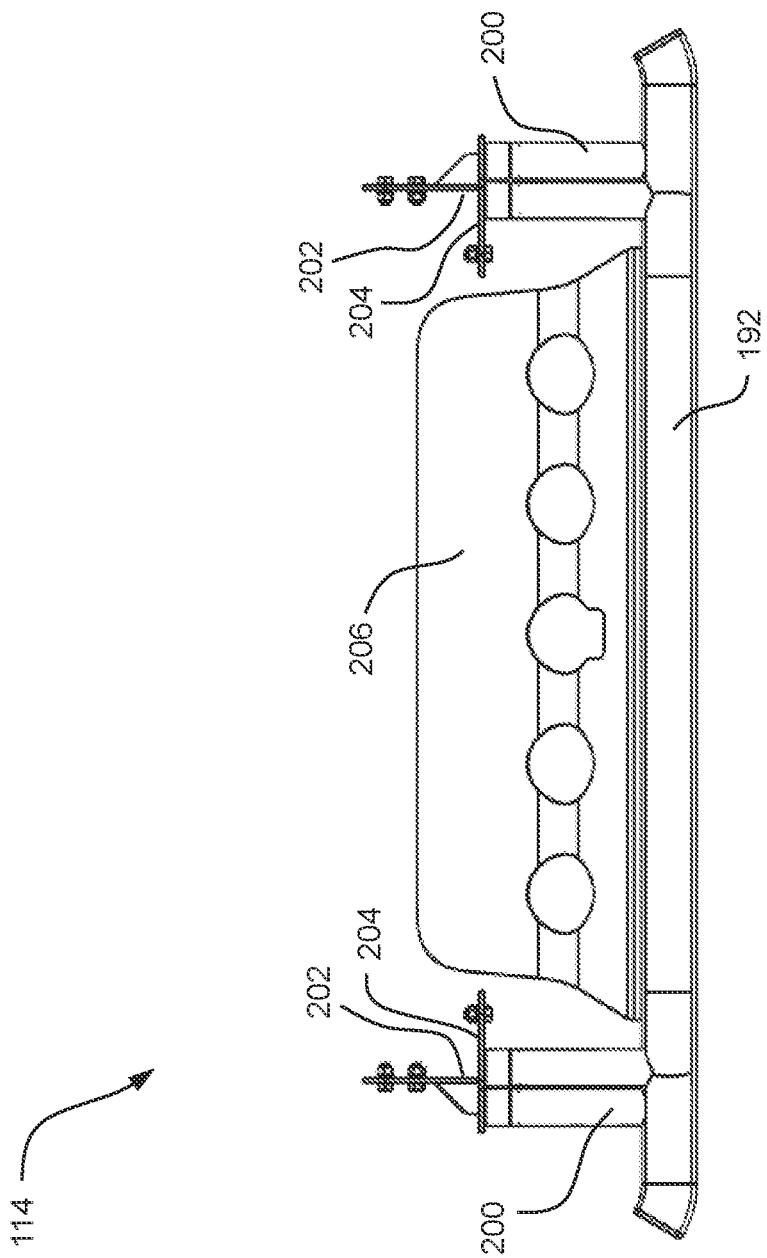
FIG. 15 is a top view of the rear bumper mounting assembly of FIG. 14.
Figure 16:
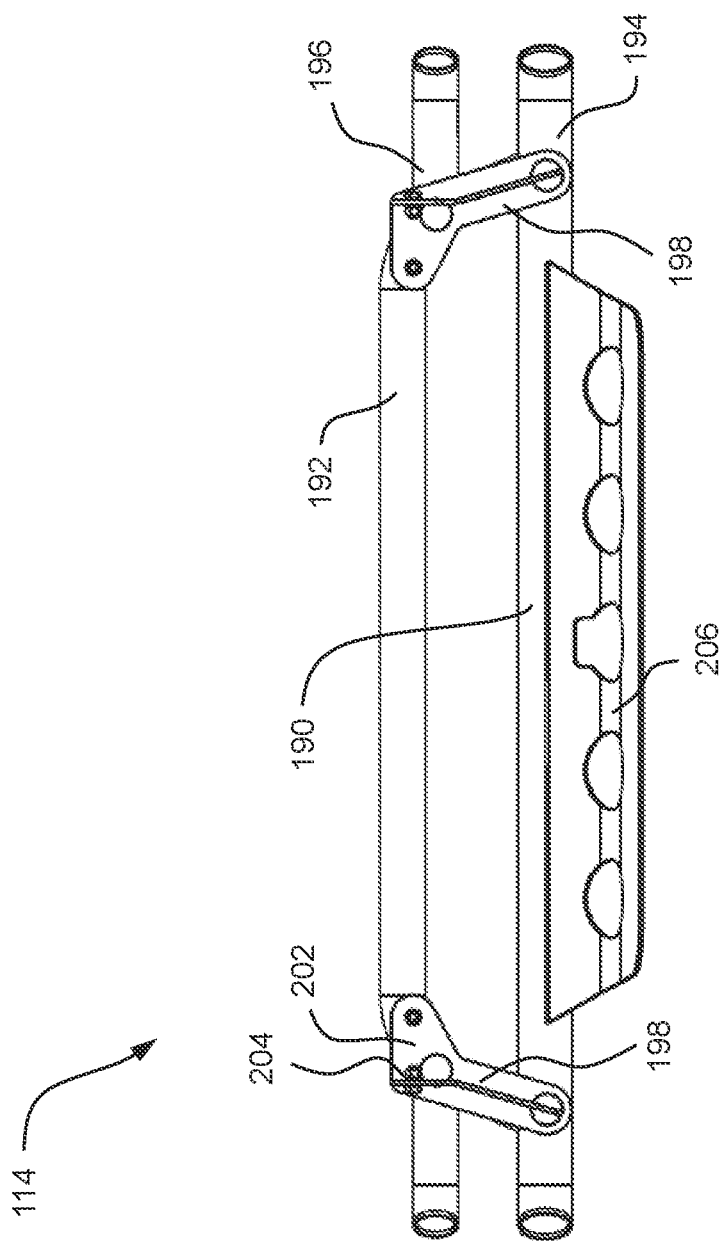
FIG. 16 is a front view of the rear bumper mounting assembly of FIG. 14.

The rear bumper assembly 114, shown in detail in FIGS. 14-16, is structurally similar to and performs substantially the same function of the front bumper assembly 108. In some embodiments, it may be advantageous for the front and rear bumper assemblies 108 and 114 to be substantially identical, such that they may be installed interchangeably, thereby reducing production costs and/or complexity. In the illustrated embodiment, the rear bumper assembly 114 is coupled to the chassis frame 120 via a pair of rear bumper mounting brackets 188. In some embodiments, the rear bumper mounting brackets 188 may be rigidly coupled to the rear bumper mounting member 178, while in other embodiments the rear bumper assembly 108 may be selectively detachable from the rear bumper mounting member 178. Preferably, the rear bumper mounting member 178 is configured such that a variety of different rear bumper geometries may be used with a common chassis frame 120, increasing the modularity of the chassis 100.

Similar to the front bumper assembly 108, the rear bumper assembly 114 is generally formed from a tubular steel (or similarly appropriate metal alloy now known or later developed) structure consisting of a lower bar 190 and an upper bar 192. The lower bar 190 is generally linear and horizontal, although the end portions 194 may be slightly curved in order to accommodate a wide variety of body panel geometries. The upper bar 192 may be generally referred to as being U-shaped, and may additionally include extensions 196 which are substantially similar in shape to the end portions 194 of the lower bar 190.

The upper and lower bars are connected to the pair of rear bumper mounting brackets 198 by one or more longitudinal connecting members 200. Each of the rear bumper mounting brackets 198 includes a pair of substantially vertical inward faces 202 and 204, at which the rear bumper mounting member 178 on the chassis frame 120 may be affixed to the rear bumper assembly 114. The rear bumper assembly 114 may additionally include a rear skid plate 206 affixed to the lower bar 190 and extending downwardly therefrom.

Figure 17:
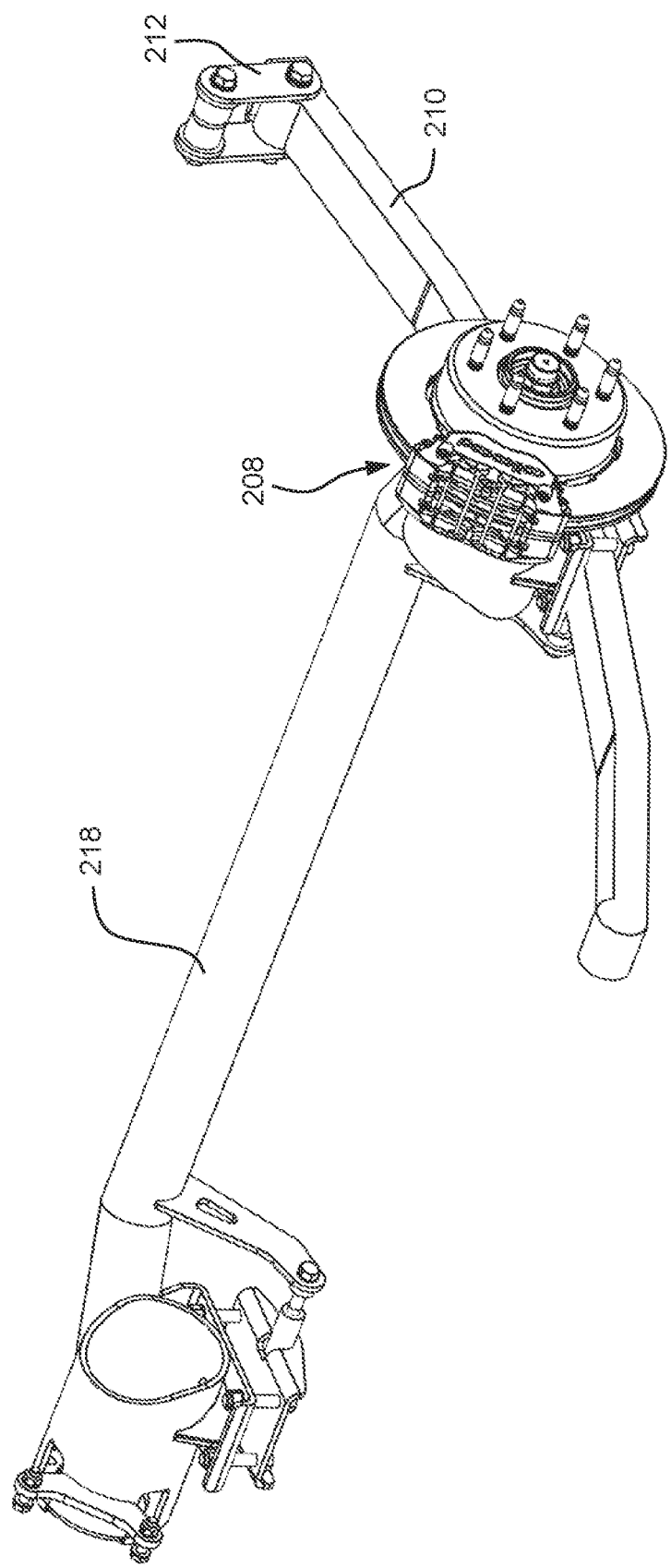
FIG. 17 is a perspective view of a rear de Dion axle and brake assembly according to an embodiment of the invention.
Figure 18:
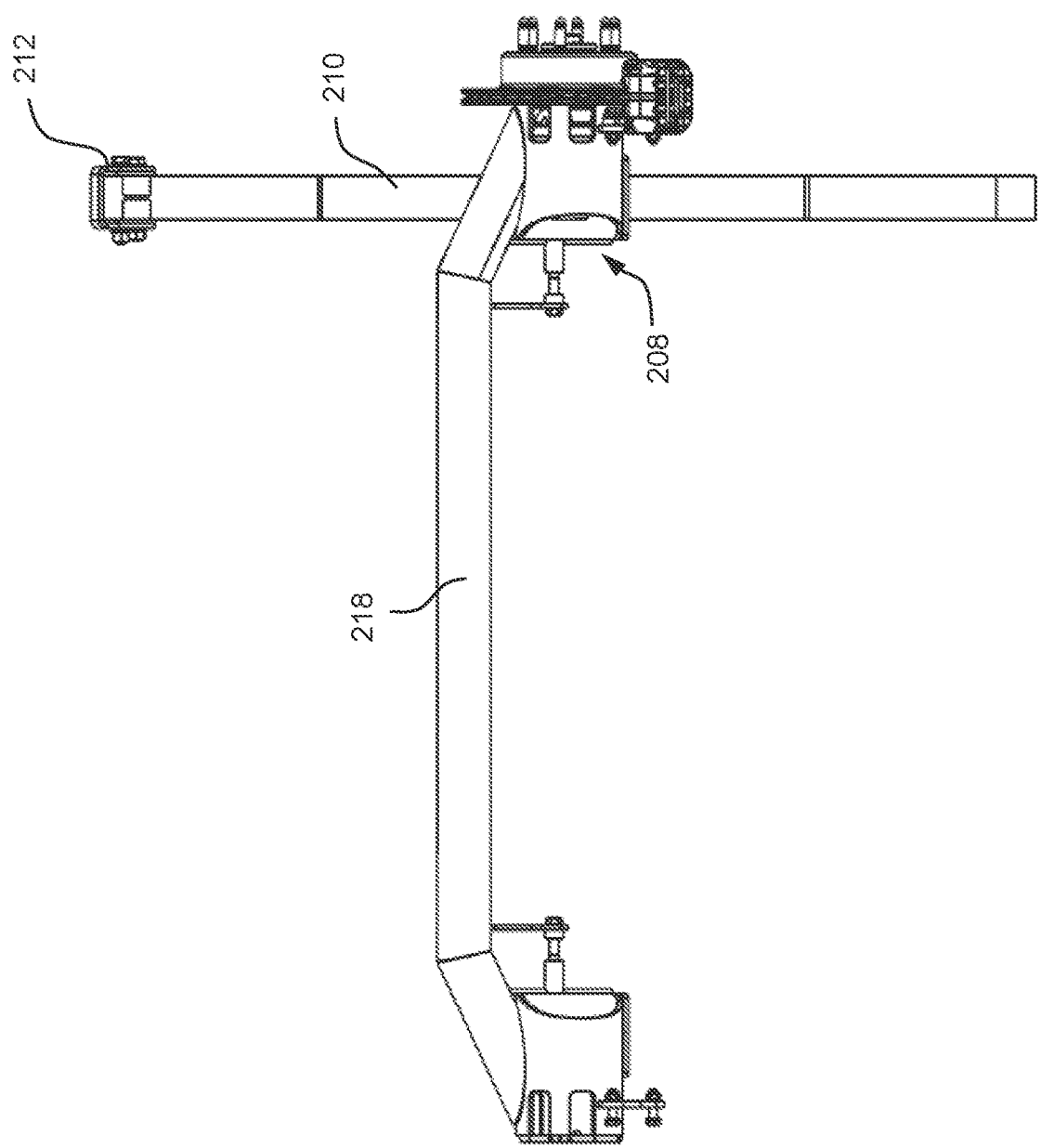
FIG. 18 is a top view of the de Dion axle and brake assembly of FIG. 17.

Referring now to FIGS. 17 and 18, unlike the front suspension and brake assembly 160, the rear suspension and brake assembly 208 may include a leaf spring 210 as an alternative to a traditional shock absorber. In the illustrated embodiment, each leaf spring 210 is connected to the longitudinal support 176*a* or 176*b* via a leaf spring mounting link 212, at a first end, and is connected to a clevis or bracket 214 located on or forming part of the mating bracket 216 between the second transition section 105 of the frame 120 and the central supports 140*a* or 140*b*, respectively. Each leaf spring 210 is connected to the brake assembly (and subsequently the respective wheel 175) proximate the center of the leaf spring 210 via a de Dion axle 218. The de Dion axle 218 extends between the respective left- and right-hand rear suspension assemblies, providing additional strength to the chassis 100 as well as improving driving characteristics.

The rear portion 104 of the chassis 100 generally includes the drive system 220 of the vehicle, such as an electric motor. The drive assembly 220 may be mounted, for example, to the rear portion via the frame formed by the downwardly-angled supports 182, the supplemental supports 184, and the cross braces 180 and 186. The drive assembly 220 may include an electric motor, as well as an inverter and a transmission or gearbox for drivingly connecting the electric motor to the wheels. The transmission may be a single-speed transmission, as is common in electric vehicles, although in some embodiments the transmission my include multiple gear ratios for different applications, speeds, and/or driving modes that a user desires.

In some embodiments, the chassis 100 may include a second drive system. The second drive system may be of a similar specification to the first drive system 220, although in other embodiments the second drive system may include a more or less powerful electric motor, different gear ratios, etc. without departing from the scope of the invention. The second drive system may be employed at the front portion 102, such that the vehicle is capable of four-wheel drive, thereby increasing its capability over a variety of driving conditions, as well as providing additional performance to the vehicle.

Figure 19:
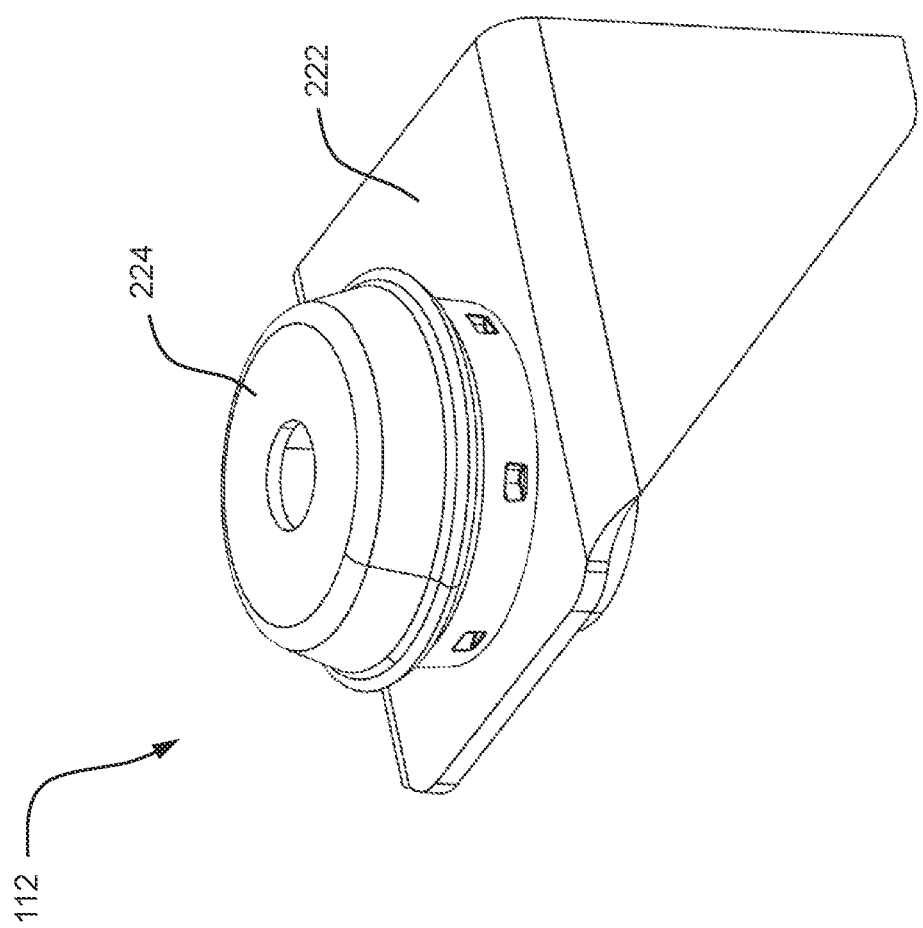
FIG. 19 is a perspective view of a body mounting fixture according to an embodiment.

Referring now to FIG. 19, the drawings illustrate a body mounting fixture 112 which forms part of the chassis 100. The body mounting fixtures 112 may be affixed to an outward-facing side of the chassis frame 120, at points which are complimentary to the mounting locations on the exterior body panels. The body mounting fixtures 112 generally include a base mounting plate 222, which may be substantially U-shaped, and a fitting 224 configured to receive and secure an exterior body panel. The fitting 224 may be a press-fit fitting, or may be another type of fitting now known or later developed for such a purpose. In the illustrated embodiment (in particular as in FIGS. 1-5), the chassis frame 120 is depicted as having six body panel mounting fixtures 112, with two located at the front portion, each between the front bumper mounting member 124 and the longitudinal supports 122*a-b*, and four fixtures 112 located along the exterior of the central section 106, with two located on each primary longitudinal support 140*a* and 140*b*, respectively. However, one of skill in the art will appreciate that the number of body mounting fixtures 112, as well as the exact location and distribution of said fixtures 112, may vary depending on the size and specific geometry of the chassis frame 120 and/or the body panels themselves, without departing from the scope of the invention.

Although the embodiment shown in has been described with reference to a specific construction of the chassis frame 120, the chassis frame may in fact be modular, such that various components may be interchangeably swapped and/or have certain characteristics which modify the size and/or shape of the chassis 100. For example, as described above the central longitudinal supports 140*a* and 140*b* may be releasably secured from the first and second transition portions 103 and 105, respectively, and replaced with supports of a different length if a user or application so desires. Such a modification may be performed during initial construction of the chassis 100 or may be performed as a service option during the vehicle's lifetime, thereby allowing the same chassis 100 to be used as a small passenger vehicle, a large passenger vehicle, a commercial vehicle, industrial vehicle, etc., without the need for multiple bespoke chassis. This may be done in conjunction with interchangeable body panels which are releasably secured form the various body panel mounting fixtures 112.

However, this modularity is not necessarily limited to simply replacing the central supports 140*a* and 140*b* to alter the length, or having the supports 140*a* and 140*b* being telescopic in nature. The length of the chassis may be adjusted by employing similar characteristics to other components of the chassis frame. For example, it may be desirable to increase the length of the rear portion of the chassis in applications where the vehicle is a pickup truck or similar bedded vehicle where increased space behind the cabin is desired. This may be achieved by lengthening the rear longitudinal supports 176*a* and 176*s*, either telescopically or releasably detaching the supports 176*a-b* from the second transition section 105 and/or the rear bumper mounting member 178 and replacing the supports with those of a different length. Similarly, the front portion 102 of the chassis 100 may be lengthened by increasing the length of the front longitudinal supports 122*a* and 122*b*, either telescopically or by releasably detaching the supports 122*a-b* from the first transition section 103 and/or the front bumper mounting member 124 and replacing the supports 122*a-b* with those of a different length. A skilled artisan will appreciate that any of chassis frame 120 components shown in the drawings and/or described above may be configured such that they are easily detachable from the rest of the chassis frame, and/or are telescopically adjustable, without departing from the scope of the invention.

In addition to being able to vary the length of the chassis 100 for specific applications, in some embodiments the width of the chassis may be similarly adjustable. This includes components in the front portion 102, the rear portion 104, and the central section 106. Similar to how the length of the chassis can be changed, this may be done by replacing individual components and/or having them be telescopically adjustable, while in some embodiments this may be achieved by selectively detaching one or more chassis sections (102-106) and replacing them with alternative chassis sections of different dimensions. For example, the front portion may be widened removing the front portion 102 and the first transition section 103 altogether by selectively detaching transition section 103 from the longitudinal central supports 140*a* and 140*b* and replacing the front portion 102 and transition section 103 with a wider equivalent. Similarly, the rear portion 104 and/or the second transition section 105 may be removed and replaced with a wider equivalent.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A vehicle chassis comprising:
    a chassis frame having a front portion, a rear portion, a central portion, a first transition section disposed between the front portion and the central portion, and a second transition portion disposed between the central portion and the rear portion;
    the central portion having a pair of longitudinal supports extending between the first transition section and the second transition section;
    the front portion having a pair of horizontal supports extending from a front end to the first transition section;
    the rear portion having a pair of rear longitudinal supports extending from a rear end to the second transition section;
    a plurality of mating brackets connecting the front portion, the rear portion, the central portion, the first transition section, and the second transition section together to form the chassis frame; and
    a plurality of mounting fixtures extending from the chassis frame, the plurality of mounting fixtures including at least one mounting fixture extending from an exterior surface of the central portion, the at least one mounting fixture includes a base mounting plate that extends substantially perpendicular from the exterior surface and a fitting that extends upward from the base mounting plate;
    wherein each of the front portion, the rear portion, the central portion, the first transition section, and the second transition section can be independently removed from an associated subset of the plurality of mating brackets.

2. The vehicle chassis of claim 1, wherein the central portion is positioned at a first vertical position, the front portion is positioned at a second vertical position, and the rear portion is positioned at a third vertical position, the second vertical position being higher than the first vertical position, and the third vertical position being higher than the first and second vertical positions.

3. The vehicle chassis of claim 1, further comprising:
    a front suspension mounting assembly positioned between the pair of longitudinal horizontal supports as part of the front portion, the front suspension mounting assembly having:

a mounting frame secured to the pair of longitudinal horizontal supports via a plurality of angular supports, the plurality of angular supports extending the mounting frame to a position below the pair of longitudinal horizontal supports, the mounting frame being substantially rectangular; and a plurality of mounts extending outwardly from the mounting frame, the plurality of mounts configured to engage with one or more control arms for supporting one or more wheel assemblies.

4. The vehicle chassis of claim 1, wherein the chassis frame further comprises a first cross brace extending between the pair of rear longitudinal supports, a second cross brace extending between a first side of the second transition portion and a second side of the second transition portion, and one or more downwardly-angled supports extending between the first cross brace and the second cross brace.

5. The vehicle chassis of claim 1, wherein the fitting is a press-fit style fitting.

6. A vehicle chassis comprising:
a chassis frame having a front portion, a rear portion, a central portion, a first transition section disposed between the front portion and the central portion, and a second transition portion disposed between the central portion and the rear portion;
the central portion having a pair of longitudinal supports extending between the first transition section and the second transition section;
the front portion having a pair of horizontal supports extending from a front end to the first transition section;
the rear portion having a pair of rear longitudinal supports extending from a rear end to the second transition section; and
a plurality of mating brackets connecting the front portion, the rear portion, the central portion, the first transition section, and the second transition section together to form the chassis frame;
wherein each of the front portion, the rear portion, the central portion, the first transition section, and the second transition section can be independently removed from an associated subset of the plurality of mating brackets; and
wherein the central portion is positioned at a first vertical position, the front portion is positioned at a second vertical position, and the rear portion is positioned at a third vertical position, the second vertical position being higher than the first vertical position, and the third vertical position being higher than the first and second vertical positions.

7. The vehicle chassis of claim 6, further comprising:
a front suspension mounting assembly positioned between the pair of horizontal supports as part of the front portion, the front suspension mounting assembly having:
a mounting frame secured to the pair of horizontal supports via a plurality of angular supports, the plurality of angular supports extending the mounting frame to a position below the pair of horizontal supports, the mounting frame being substantially rectangular; and
a plurality of mounts extending outwardly from the mounting frame, the plurality of mounts configured to engage with one or more control arms for supporting one or more wheel assemblies.

8. The vehicle chassis of claim 6, wherein the chassis frame further comprises a first cross brace extending between the pair of rear longitudinal supports, a second cross brace extending between a first side of the second transition portion and a second side of the second transition portion, and one or more downwardly-angled supports extending between the first cross brace and the second cross brace.

9. The vehicle chassis of claim 6, further comprising a plurality of mounting fixtures extending from the chassis frame.

10. The vehicle chassis of claim 9, wherein the plurality of mounting fixtures further comprises at least one mounting fixture extending from an exterior surface of the central portion, the at least one mounting fixture includes a base mounting plate that extends substantially perpendicular from the exterior surface and a fitting that extends upward from the base mounting plate.

11. The vehicle chassis of claim 10, wherein the fitting is a press-fit style fitting.

12. A vehicle chassis comprising:
a chassis frame having a front portion, a rear portion, a central portion, a first transition section disposed between the front portion and the central portion, and a second transition portion disposed between the central portion and the rear portion;
the central portion having a pair of longitudinal supports extending between the first transition section and the second transition section;
the front portion having a pair of horizontal supports extending from a front end to the first transition section;
the rear portion having a pair of rear longitudinal supports extending from a rear end to the second transition section; and
a plurality of mating brackets connecting the front portion, the rear portion, the central portion, the first transition section, and the second transition section together to form the chassis frame;
a front suspension mounting assembly positioned between the pair of horizontal supports as part of the front portion, the front suspension mounting assembly having:
a mounting frame secured to the pair of horizontal supports via a plurality of angular supports, the plurality of angular supports extending the mounting frame to a position below the pair of horizontal supports, the mounting frame being substantially rectangular; and
a plurality of mounts extending outwardly from the mounting frame, the plurality of mounts configured to engage with one or more control arms for supporting one or more wheel assemblies;
wherein each of the front portion, the rear portion, the central portion, the first transition section, and the second transition section can be independently removed from an associated subset of the plurality of mating brackets.

13. The vehicle chassis of claim 12, wherein the central portion is positioned at a first vertical position, the front portion is positioned at a second vertical position, and the rear portion is positioned at a third vertical position, the second vertical position being higher than the first vertical position, and the third vertical position being higher than the first and second vertical positions.

14. The vehicle chassis of claim 12, wherein the chassis frame further comprises a first cross brace extending between the pair of rear longitudinal supports, a second cross brace extending between a first side of the second transition portion and a second side of the second transition portion, and one or more downwardly-angled supports extending between the first cross brace and the second cross brace.

15. The vehicle chassis of claim 12, further comprising a plurality of mounting fixtures extending from the chassis frame.

16. The vehicle chassis of claim 15, wherein the plurality of mounting fixtures further comprises at least one mounting fixture extending from an exterior surface of the central portion, the at least one mounting fixture includes a base mounting plate that extends substantially perpendicular from the exterior surface and a fitting that extends upward from the base mounting plate.

17. The vehicle chassis of claim 16, wherein the fitting is a press-fit style fitting.

18. A vehicle chassis comprising:
a chassis frame having a front portion, a rear portion, a central portion, a first transition section disposed between the front portion and the central portion, and a second transition portion disposed between the central portion and the rear portion;
the central portion having a pair of longitudinal supports extending between the first transition section and the second transition section;
the front portion having a pair of horizontal supports extending from a front end to the first transition section;
the rear portion having a pair of rear longitudinal supports extending from a rear end to the second transition section;
a plurality of mating brackets connecting the front portion, the rear portion, the central portion, the first transition section, and the second transition section together to form the chassis frame; and
a first cross brace extending between the pair of rear longitudinal supports, a second cross brace extending between a first side of the second transition portion and a second side of the second transition portion, and one or more downwardly-angled supports extending between the first cross brace and the second cross brace;
wherein each of the front portion, the rear portion, the central portion, the first transition section, and the second transition section can be independently removed from an associated subset of the plurality of mating brackets.

19. The vehicle chassis of claim 18, wherein the central portion is positioned at a first vertical position, the front portion is positioned at a second vertical position, and the rear portion is positioned at a third vertical position, the second vertical position being higher than the first vertical position, and the third vertical position being higher than the first and second vertical positions.

20. The vehicle chassis of claim 18, further comprising:
a front suspension mounting assembly positioned between the pair of horizontal supports as part of the front portion, the front suspension mounting assembly having:
a mounting frame secured to the pair of horizontal supports via a plurality of angular supports, the plurality of angular supports extending the mounting frame to a position below the pair of horizontal supports, the mounting frame being substantially rectangular; and
a plurality of mounts extending outwardly from the mounting frame, the plurality of mounts configured to engage with one or more control arms for supporting one or more wheel assemblies.

21. The vehicle chassis of claim 18, further comprising a plurality of mounting fixtures extending from the chassis frame.

22. The vehicle chassis of claim 21, wherein the plurality of mounting fixtures further comprises at least one mounting fixture extending from an exterior surface of the central portion, the at least one mounting fixture includes a base mounting plate that extends substantially perpendicular from the exterior surface and a fitting that extends upward from the base mounting plate.

23. The vehicle chassis of claim 22, wherein the fitting is a press-fit style fitting.

* * * * *